US011113634B2

(12) United States Patent
Stong

(10) Patent No.: US 11,113,634 B2
(45) Date of Patent: Sep. 7, 2021

(54) CHECK-IN SYSTEMS AND METHODS

(71) Applicant: Dennis Stong, Murray, UT (US)

(72) Inventor: Dennis Stong, Murray, UT (US)

(*) Notice: Subject to any disclaimer, the term of this patent is extended or adjusted under 35 U.S.C. 154(b) by 338 days.

(21) Appl. No.: 14/583,707

(22) Filed: Dec. 28, 2014

(65) Prior Publication Data
US 2015/0186803 A1 Jul. 2, 2015

Related U.S. Application Data

(60) Provisional application No. 61/922,623, filed on Dec. 31, 2013.

(51) Int. Cl.
*G06Q 10/02* (2012.01)
*G06Q 30/02* (2012.01)

(52) U.S. Cl.
CPC ......... *G06Q 10/02* (2013.01); *G06Q 30/0226* (2013.01)

(58) Field of Classification Search
CPC ..................... G06Q 10/02; G06Q 30/0226
See application file for complete search history.

(56) References Cited

U.S. PATENT DOCUMENTS

| 6,196,458 | B1 | 3/2001 | Walker et al. |
| 7,403,916 | B1 | 7/2008 | Brownell et al. |
| 8,498,900 | B1 | 7/2013 | Spirin et al. |
| 2002/0002538 | A1* | 1/2002 | Ling .................... G06Q 20/04 705/41 |

(Continued)

FOREIGN PATENT DOCUMENTS

| JP | 2004-070775 | 3/2004 |
| KR | 10-1052806 | 7/2011 |

(Continued)

OTHER PUBLICATIONS

Hao Wang, Location Recommendation in Location-based Social Networks using User Check-in Data, p. 364-366, 2013 (Year: 2013).*

(Continued)

*Primary Examiner* — Kevin H Flynn
*Assistant Examiner* — Ibrahim N El-Bathy
(74) *Attorney, Agent, or Firm* — David B. Tingey; Bryant J. Keller; Kirton McConkie

(57) ABSTRACT

Systems and methods provide check-in services to mobile devices using a check-in enabled network. When the mobile computer device attempts to access the check-in enabled network, a connection is established between the mobile computer device and the check-in enabled network. Check-in information is passed between the mobile computer device and the check-in enabled network to check in a user of the mobile computer device to an entity providing the check-in enabled network. The method may also include determining whether any additional actions are available to provide to the mobile device via the check-in enabled network, when an additional action is available, presenting the additional action to the user via the mobile device, and receiving input from the mobile device to take the additional action. Many additional actions may be available and are disclosed herein. The user's personal information may be protected while providing financial transactions with the system.

21 Claims, 5 Drawing Sheets

(56) References Cited

U.S. PATENT DOCUMENTS

| | | | |
|---|---|---|---|
| 2003/0149576 A1 | 8/2003 | Sunyich | |
| 2006/0149643 A1 | 7/2006 | Reiner et al. | |
| 2007/0083444 A1* | 4/2007 | Matthews | G06Q 10/04 705/30 |
| 2007/0156457 A1* | 7/2007 | Brown | G06Q 50/22 705/2 |
| 2009/0292642 A1* | 11/2009 | Han | G06Q 20/12 705/71 |
| 2010/0015993 A1* | 1/2010 | Dingler | H04L 67/18 455/456.1 |
| 2010/0217675 A1* | 8/2010 | Bookstaff | G06Q 40/00 705/17 |
| 2011/0173060 A1 | 7/2011 | Gallagher | |
| 2011/0178863 A1* | 7/2011 | Daigle | G06Q 30/0231 705/14.31 |
| 2011/0187493 A1 | 8/2011 | Elfstrom et al. | |
| 2011/0302504 A1 | 12/2011 | Khare et al. | |
| 2012/0095791 A1* | 4/2012 | Stefik | G06Q 10/02 705/5 |
| 2012/0108216 A1* | 5/2012 | Wohlwend | H04W 4/021 455/414.1 |
| 2012/0233158 A1* | 9/2012 | Braginsky | H04L 67/18 707/724 |
| 2012/0253997 A1 | 10/2012 | Kovalev | |
| 2013/0304578 A1* | 11/2013 | Kannan | G06Q 30/0261 705/14.54 |
| 2013/0305320 A1* | 11/2013 | Warrick | H04L 61/103 726/4 |
| 2014/0046845 A1* | 2/2014 | Dogin | G06Q 20/322 705/44 |
| 2014/0101008 A1 | 4/2014 | Stong | |
| 2014/0114776 A1* | 4/2014 | Solanki | G06Q 30/06 705/15 |
| 2014/0189087 A1* | 7/2014 | Chen | G06Q 10/1093 709/223 |
| 2014/0337138 A1* | 11/2014 | Chitalia | G06Q 20/322 705/14.64 |
| 2015/0025919 A1* | 1/2015 | West | G06O 50/12 705/5 |

FOREIGN PATENT DOCUMENTS

| | | |
|---|---|---|
| WO | WO 2014/055965 A1 | 4/2014 |
| WO | WO 2015/103091 A1 | 7/2015 |

OTHER PUBLICATIONS

Badri Nath et al., "RFID Technology and Applications", IEEE Pervasive Computing, 2006, vol. 5, Issue 1, pp. 22-24.

"Restaurant Floor Picture and Display Board Management and Answers to Questions (The Practical and Elite Version)", Kanban Management and QA (book), Apr. 2013, Guangzhou Economic Publishing House, China.

"Foundation of Customer Management", Self-study higher education examination guide for Chinese customer management professional level certificate (book), Jun. 30, 2012, China Economy Publishing House Beijing, China.

Ande Logistics Solutions Optimization and Integration (book), Jul. 31, 2007, China Logistics Publishing House, Beijing, China.

* cited by examiner

CHECK-IN SYSTEMS AND METHODS

CROSS-REFERENCE TO RELATED APPLICATION

This application claims priority to U.S. Provisional patent application Ser. No. 61/922,623, filed Dec. 31, 2013, and entitled "CHECK-IN SYSTEMS AND METHODS"; the entire disclosure of which is hereby incorporated by reference.

BACKGROUND OF THE INVENTION

1. Field of the Invention

The present invention relates to electronic check-in services, and more particularly to a systems and methods for electronically checking in when arriving at an enabled location.

2. Background and Related Art

Many times when a customer arrives at a restaurant, hotel, medical clinic, or another establishment, the user is required to check in before receiving the desired attention. In some cases, these check-in processes can be time consuming, require a customer to stand in line or to "take a number", and otherwise be time-consuming. In an effort to reduce the hassles associated with some check-in procedures, some methods for streamlining check-ins have been developed. In some cases, however, current check-in methods are unnecessarily laborious and are limited in their flexibility. Additionally, some current check-in methods have failed to adequately utilize modern technology to enhance such methods.

Thus, while techniques currently exist that are used to streamline check-in procedures, challenges still exist, including those discussed above. Accordingly, it would be an improvement in the art to augment or even replace current techniques with other techniques.

BRIEF SUMMARY OF THE INVENTION

Systems, methods, and non-transitory computer-readable media storing instructions for providing check-in services are disclosed. According to implementations of the invention, methods for providing check-in services may be provided to a system having a mobile device and a check-in enabled network. The methods may include locating a check-in enabled network when the mobile computer device is within sufficient physical proximity to the check-in enabled network, accessing the check-in enabled network, and providing check-in information to the check-in enabled network to check in a user of the mobile computer device to an entity providing (or otherwise using) the check-in enabled network.

The methods may also include determining whether any additional actions are available to the mobile device from the check-in enabled network, when an additional action is available, presenting the additional action to the user via the mobile device, and receiving input from the user causing the mobile device to take the additional action. The additional action may be an action selected from the following: providing a payment to an entity operating the check-in enabled network; providing additional information about the user to the check-in enabled network; providing purchase information to the check-in enabled network; using the mobile computer device to fill out paperwork necessary for the user to complete check-in at a business operating the check-in enabled network; providing customer loyalty information to the check-in enabled network from the mobile computer device; providing coupons to or from the mobile computer device; guiding or directing the user within a store (or other location) operating the check-in enabled network; tracking the user within a store operating the check-in enabled network; completing a check-out transaction associated with a purchase of goods within a store operating the check-in enabled network; directing the user to a parking location for an order pick-up; tracking arrival and readiness of the user's party for seating at a restaurant; notifying the user of an updated status by an action selected from the group consisting of: a text message; notification through a check-in app; an automated telephone call; an email; and a notification method provided by the mobile computer device; generating a notification to an account holder of an account used for check in that a check-in event has occurred; obtaining special requests from a user; obtaining an authentication of the user through the mobile computer device; and/or otherwise taking any other suitable action associated with check-in.

When the additional action involves providing a payment for goods and/or services to an entity operating the check-in enabled network, payment may be provided to a location, entity, person, and/or other business while protecting the user's personal information. While the user's personal information can be protected in any suitable manner, in some implementations, the user's personal information is protected by storing the user's payment information at a third-party repository, so that the actual transfer of funds occurs between the repository and the business. The repository may obtain authorization for the transfer of funds from the user via the check-in enabled network and/or the mobile computer device. Alternatively, the repository may obtain authorization for the transfer of funds from the user via a third-party network and/or the mobile computer device.

According to another implementation of the invention, a method for providing check-in services includes using the wireless network device to provide check-in enabled network, detecting when the mobile computer device attempts to access the check-in enabled network, establishing a connection between the mobile computer device and the check-in enabled network, and receiving check-in information to the check-in enabled network to check in a user of the mobile computer device to an entity providing the check-in enabled network.

In some implementations, the method also optionally includes determining whether any additional actions are available to provide to the mobile device via the check-in enabled network, when an additional action is available, presenting the additional action to the user via the mobile device, and receiving input from the mobile device to take the additional action. The additional actions may include those discussed above. The user's personal information may be protected as discussed above as well.

The described systems and methods can be modified in any suitable manner. Indeed, in some implementations, instead of requiring a user's mobile device to check into a business' check-in enabled network before the user is checked into the business, the user's mobile device (e.g., smartphone, tablet, handheld computer, cellphone, function phone, and/or any other suitable known or novel mobile device) is configured (e.g., via an app installed on the device and/or a webpage accessible through the device) to use the device's own communication methods (e.g., its telephone services, WiFi, Bluetooth, etc.) to check into the business. Such a check in process can be initiated in any suitable manner, including, without limitation, by having the user start the check-in process through an app and/or website and/or by having the device automatically begin the check-in process as the device is determined to be in proximity to the desired business. In this regard, the proximity of the mobile device to the business can be determined in any suitable manner, including, but not limited to, the use of GPS location; the use of multi-lateration of radio signals between radio towers and/or transmitters (e.g., cell tower triangulation) for applicable mobile devices; Bluetooth positioning techniques, WiFi positioning techniques, and/or any suitable technique that is capable of substantially determining the proximity of a user's mobile device to a specific business location.

While the methods and process of the present invention may be particularly useful in the area checking users into a restaurant, those skilled in the art can appreciate that the described methods and processes can be used in a variety of different applications and in a variety of different areas to help users check-in to an establishment, location, service provider, store, and/or other business. By way of example, the described systems and methods can be used to check one or more users into a hotel, motel, automotive repair shop, medical office, dental office, legal office, movie theater, store, amusement park, amusement park ride, registration process, audition, and/or any other suitable business and/or check-in process.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
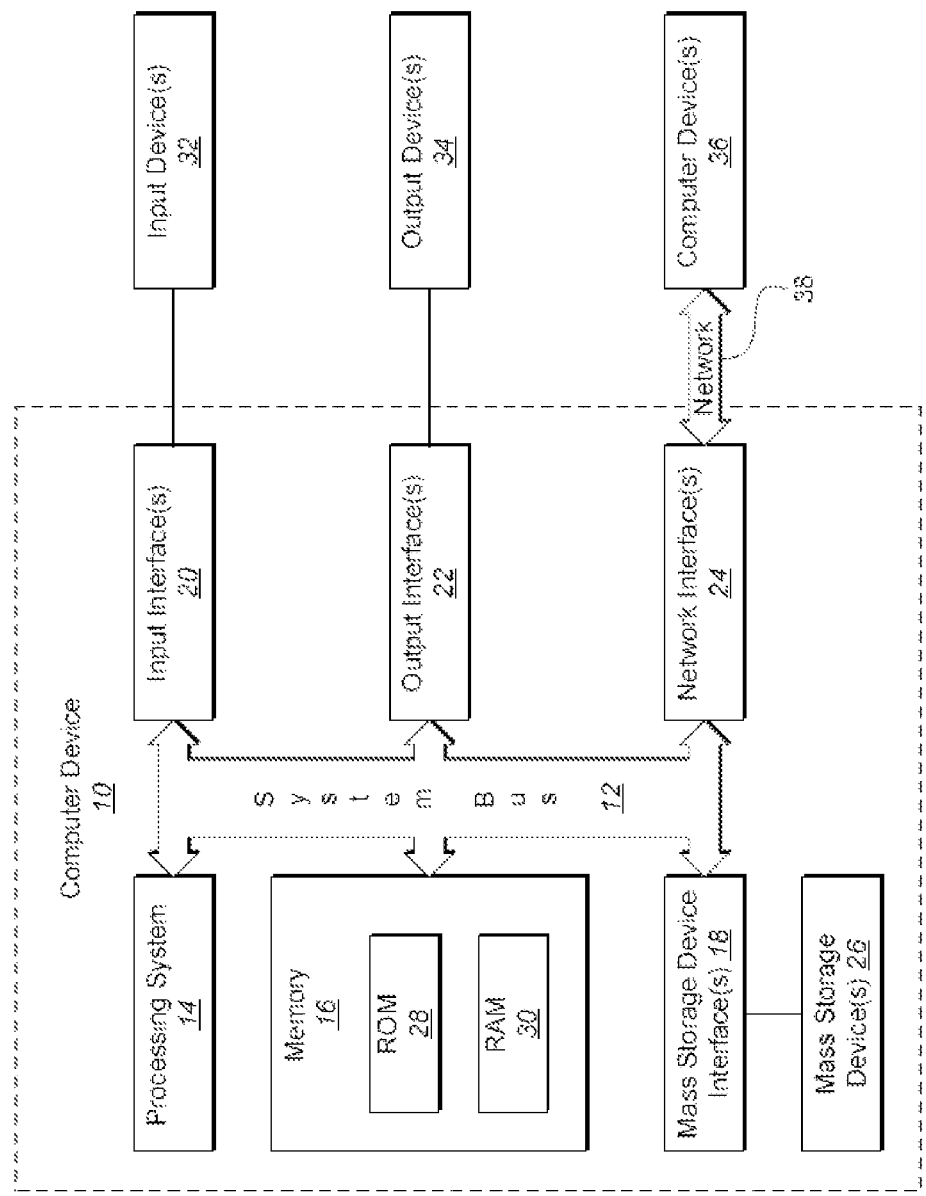
FIG. 1 shows a representative embodiment of a computer system for use with some embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Systems, methods, and non-transitory computer-readable media storing instructions for providing check-in services are disclosed. According to some embodiments of the invention, a method for providing check-in services may be provided to a system having a mobile device and a check-in enabled network. Some embodiments of the method include locating a check-in enabled network when the mobile computer device is within sufficient physical proximity to the check-in enabled network, accessing the check-in enabled network, and providing check-in information to the check-in enabled network to check in a user of the mobile computer device to an entity providing the check-in enabled network.

In some embodiments, the method also includes determining whether any additional actions are available to the mobile device from the check-in enabled network, when an additional action is available, presenting the additional action to the user via the mobile device, and receiving input from the user causing the mobile device to take the additional action. The additional action may be one or more actions selected from the following: providing a payment to an entity operating the check-in enabled network; providing additional information about the user to the check-in enabled network; providing purchase information to the check-in enabled network; using the mobile computer device to fill out paperwork necessary for the user to complete check-in at a business operating the check-in enabled network; providing customer loyalty information to the check-in enabled network from the mobile computer device; providing coupons to or from the mobile computer device; guiding or directing the user within a store, location, and/or other business operating the check-in enabled network; tracking the user within a store operating the check-in enabled network; completing a check-out transaction associated with a purchase of goods within a store operating the check-in enabled network; directing the user to a parking location for an order pick-up; obtaining a list of special requests (e.g., a high-chair, seating preferences, and/or any other requests) and/or accommodations (e.g., wheelchair accessibility, allergy notifications, and/or any other accommodations) for the user; tracking arrival and readiness of the user's party for seating at a restaurant; notifying the user of an updated status by an action selected from the group consisting of: a text message; notification through a check-in app; an automated telephone call; an email; a notification method provided by the mobile computer device; and/or any other suitable notification method; generating a notification to an account holder of an account used for check in that a check-in event has occurred; obtaining an authentication of the user through the mobile computer device; and/or any other suitable action.

In some embodiments, when the additional action involves providing a payment for goods or services to an entity operating the check-in enabled network, payment is optionally provided to a business while protecting the user's personal information. While the user's personal information can be protected in any suitable manner, in some embodiments, the user's personal information is protected by storing the user's payment information at a third-party repository, so that the actual transfer of funds occurs between the repository and the business. The repository may obtain authorization for the transfer of funds in any suitable manner, including, without limitation, from the user via the check-in enabled network and the mobile computer device.

Alternatively, in some embodiments, the repository obtains authorization for the transfer of funds from the user via a third-party network and the mobile computer device.

According to some other embodiments of the invention, a method for providing check-in services includes using the wireless network device to provide check-in enabled network, detecting when the mobile computer device attempts to access the check-in enabled network, establishing a connection between the mobile computer device and the check-in enabled network, and receiving check-in information to the check-in enabled network to check in a user of the mobile computer device to an entity providing the check-in enabled network.

In some embodiments, the method also optionally includes determining whether any additional actions are available to provide to the mobile device via the check-in enabled network, when an additional action is available, presenting the additional action to the user via the mobile device, and receiving input from the mobile device to take the additional action. The additional actions may include those discussed above. The user's personal information may be protected as discussed above as well.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including, without limitation, embedded systems with general purpose processing units, digital/media signal processors ("DSP/MSP"), application specific integrated circuits ("ASIC"), standalone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire ("IEEE 1394"), or another interface. For example, in some embodiments input interface 20 includes an ASIC that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
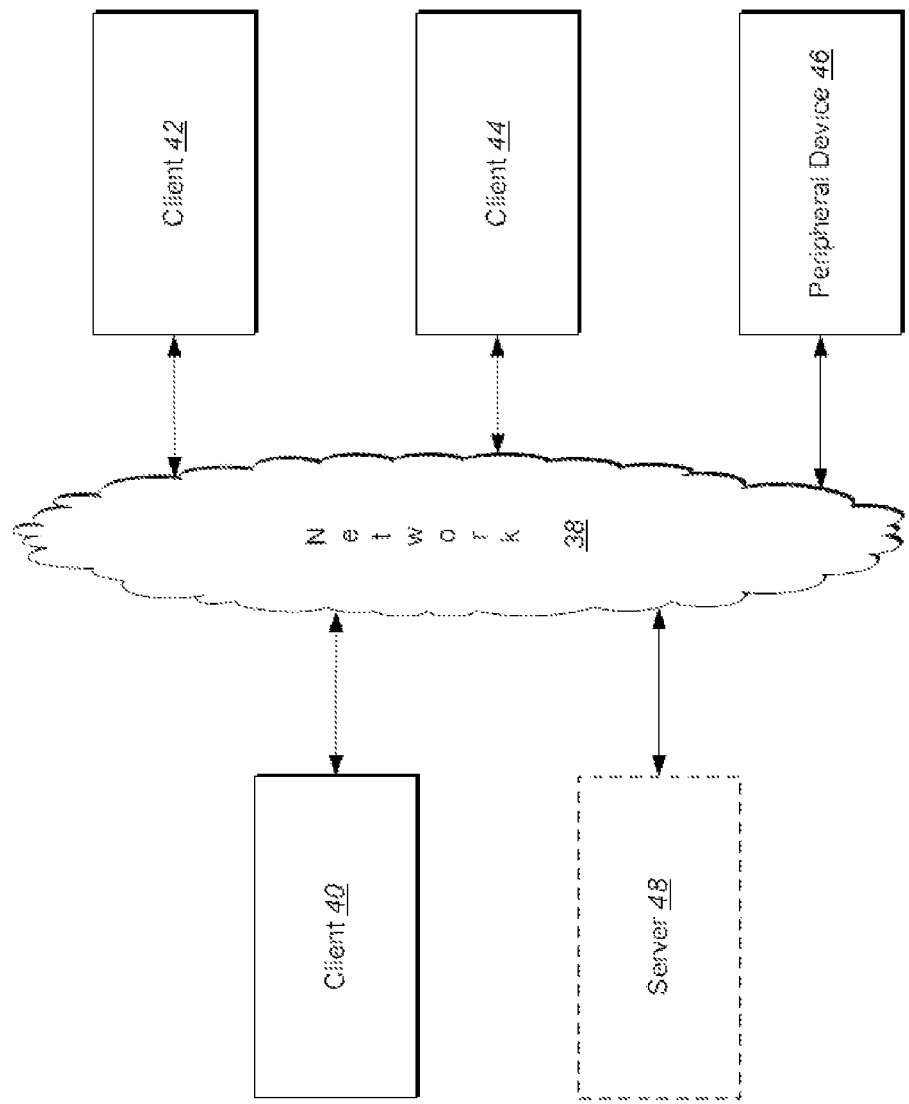
FIG. 2 shows a representative embodiment of a networked computer system for use with some embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, some embodiments of the invention embrace cloud-based architectures where one or more computer functions are performed by one or more remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
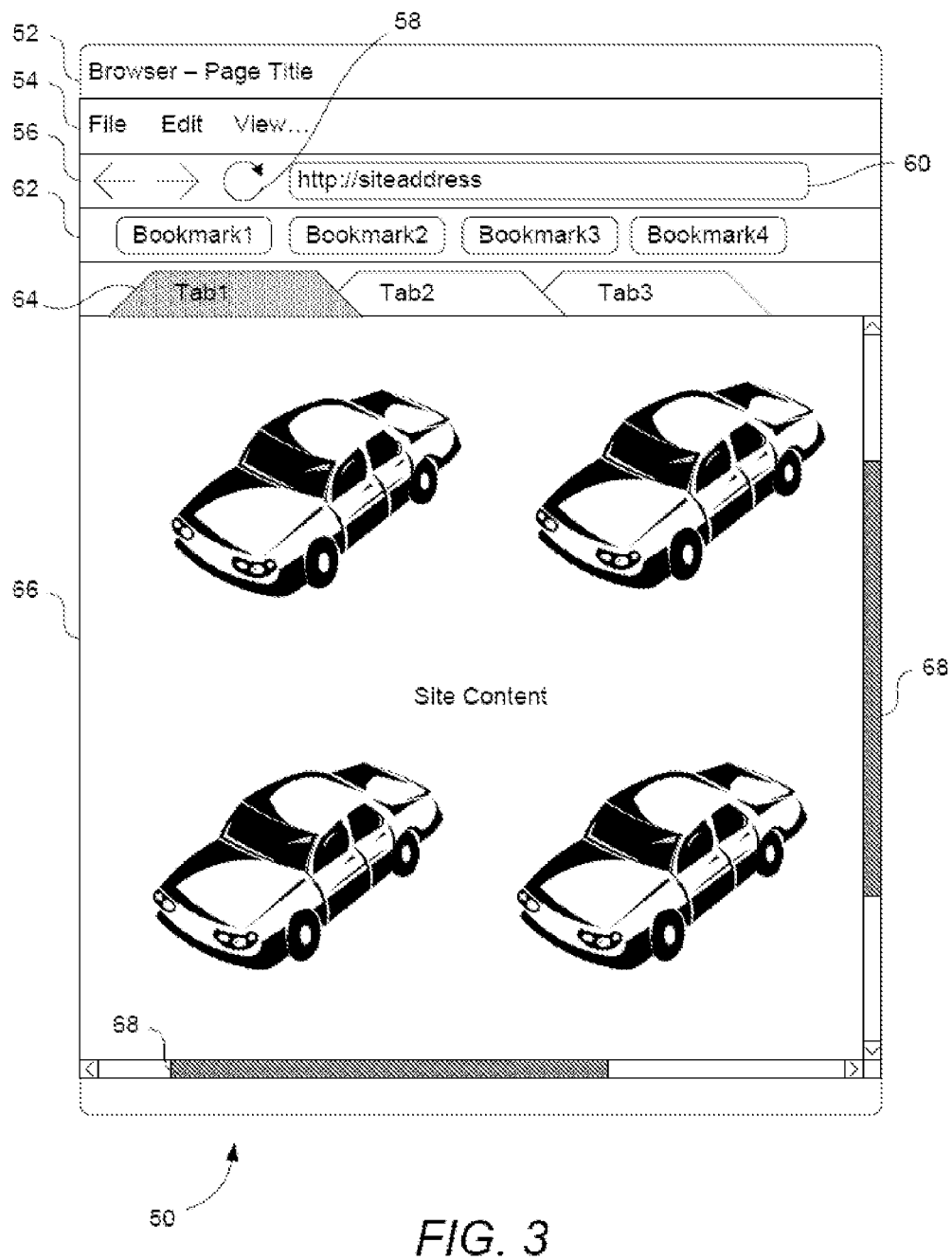
FIG. 3 shows a representative embodiment of a browser window for use in accessing the Internet.

To minimize the need to download and/or install programs on users' computers, some embodiments of the invention utilize existing and/or novel web browser technology. Many browser programs currently exist or are under development, and it would be impossible to name all such browser programs, but non-limiting examples of such programs include Microsoft's Internet Explorer, Mozilla Firefox, Google Chrome, Apple Safari, Opera Software's Opera browser, as well as myriad browsers specifically configured for specific devices, such as Internet-connected smart phones and the like. While the exact display of each browser can vary from browser to browser and while most are moderately to highly configurable so as to vary the exact display, FIG. 3 shows a representative embodiment of a browser window 50 similar to what might be displayed on a user's computer device. It will be appreciated that many of the features described below with respect to the illustrated browser window 50 are optional or are optionally displayed or hidden as desired by the user, but each feature is typical or illustrative of features common to many browser programs.

In accordance with some embodiments, the browser window 50 of FIG. 3 includes a title bar 52. The title bar 52 often is used to display a page name of whatever page is actively being viewed. Most commonly, the page name that is displayed is selected by the administrator of the website being viewed, and the page name often includes one or more phrases associated with the administrator of the website and/or the page being viewed. In some embodiments, the browser window 50 also includes a menu bar 54 that includes items that may be selected to provide access to various menu functions, as is well known in the art. Of course, in some embodiments, the menu functions provided in the menu bar 54 vary according to the specific browser program, among other considerations, and access to menu functions may be provided other than by a menu bar similar to menu bar 54.

The browser window 50 of FIG. 3 also includes (in accordance with some embodiments) an address bar 56, which in the browser window 50 shown in FIG. 3 includes several browser controls 58 and an address entry area 60. In some embodiments, the browser controls 58 and the address entry area 60 facilitate browsing using the window, permitting the user, for example, to go back one or more pages, to go forward one or more pages, to refresh a page, and/or to type in a destination site's address to directly access a page. Such browser features are well known in the art and need not be further discussed.

In some embodiments, the browser window 50 also includes a bookmark bar 62 that a user can populate with bookmarks to commonly-accessed web pages, such that the user can quickly re-access the page(s) by clicking on the relevant bookmark button. In some of the most common browser programs, it is possible for the user to have several different websites open simultaneously, and for the browser to provide rapid access, switching between, and management of the various open sites by way of various tabs 64, as shown in FIG. 3. In some embodiments, each tab 64 provides access to one open website. The tabs 64 facilitate navigation between different open websites. The contents of each open and actively-viewed website may be displayed in a content area 66. Thus, the content displayed in the content area 66 may vary depending on which tab 64 is selected, and which website is being viewed.

Whereas, in some embodiments, the tabs facilitate navigating between different websites, the browser window 50 optionally includes features to facilitate navigating within a website, as is known in the art. Specifically, in some embodiments, the browser window optionally includes one or more scroll bars 68. When a portion of the website being viewed lies outside of the viewable portion of the content area 66, the user may use the scroll bars 68 to access non-visible portions, as is known in the art.

Many currently-available browser programs permit the installation of additional features, such as through what are commonly known as "browser extensions." Browser extensions are becoming more and more common in today's browser programs, and have become one of the means, if not the standard, for extending the functionality of the browser programs. For browsers that do not currently support browser extensions, other mechanisms and installed programs are often available to provide similar functionality. Some embodiments of the invention utilize a browser extension or similar format to provide functions in accordance with embodiments of the invention. The use and installation of a browser extension is typically significantly less involved and less computer-intensive than the use and installation of a stand-alone program.

Figure 4:
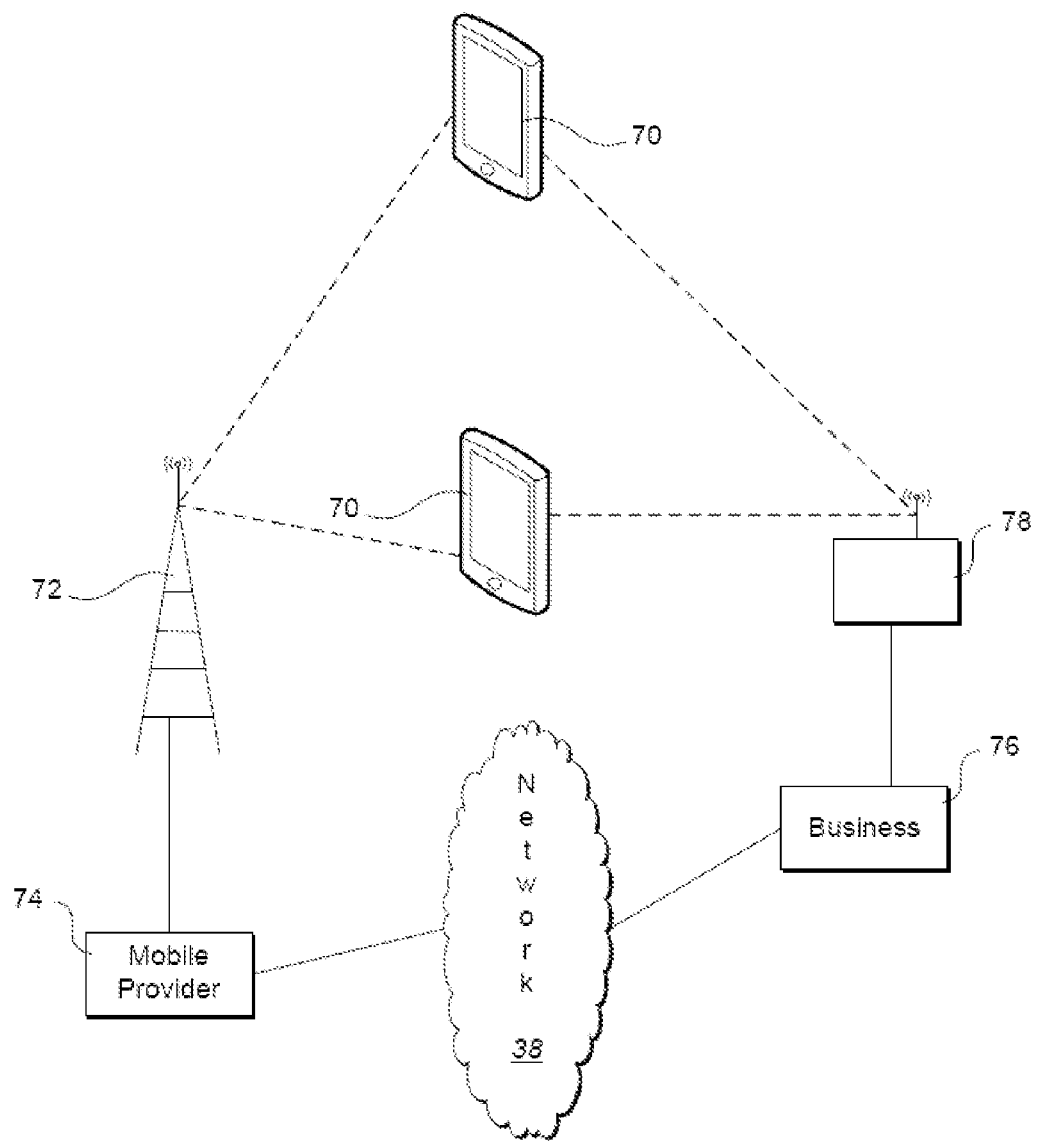
FIG. 4 shows a representative embodiment of a system for providing check-in services to a user of a mobile device.

Methods in accordance with embodiments of the invention are provided using user's mobile computing devices, and may be provided using stand-alone programs on the devices, using browser extensions installed on the devices, and/or through a browser interface, as described above. FIG. 4 illustrates the major components of an illustrative configuration of devices and participants in accordance with features of embodiments of the invention. Users of the instant check-in system access the system through their mobile devices, illustrated in FIG. 4 as mobile devices 70. The mobile devices 70 may be any type of mobile device (e.g., smart phone, cellphone, PDA, tablet, laptop, feature phone, handheld computing device, and/or other mobile device) currently available, whether or not specifically discussed herein, or any type of mobile device that later becomes available. It has become common for functionality to be provided to devices such as mobile devices 70 using apps, and embodiments of the invention embrace the use of apps to provide the functionality discussed herein.

In some embodiments, the mobile devices 70 are at least intermittently communicatively connected to one or more other devices. In many instances, the mobile devices 70 may be communicatively connected to the network 38 (e.g., the Internet) through a typically wireless wide-area connection, such as a cell site 72 provided and operated by a mobile provider 74 or an entity affiliated with the mobile provider 74. For example, many mobile devices are purchased under contract from mobile providers, and are used for telephone calls and to transmit data to and from the network 38, allowing users to have access and connectivity wherever the wide-area connection is available. At least some features of embodiments of the invention may be provided using a connection between the mobile devices 70 and the network 38 provided by third parties such as the mobile provider 74.

In some embodiments, when users of mobile devices 70 are in sufficient physical proximity to a business 76 (or to a wireless network maintained by or provided for the business 76), the users' mobile devices are configured to access a typically wireless local-area connection provided by a wireless access device 78 of the business 76. The wireless access device 78 may be any desired type of access device (e.g., wireless access point, wireless router, etc.) and may use any desired communications mechanism and protocol (e.g., Bluetooth, IEEE 802.11, etc.), including mechanisms and protocols now utilized or created in the future. While reference is made herein to a business such as business 76, it should be understood that such references are exemplary only, and embodiments embrace the use of local area networks maintained by or at residences, by or at schools, by mobile devices, by or at churches, and/or by or at any desired location or entity.

When a user of one of the mobile devices 70 enters into the physical area covered by the local area network of the business, the user may utilize (directly or indirectly) the mobile device 70 to access check-in features provided by the business using, for example a check-in app on the mobile device 70. While the remaining examples discussed herein will utilize a check-in app on the mobile device to provide the features discussed herein, it should be remembered that embodiments of the invention embrace the provision of such features, for example, through a web portal accessed by a browser of the mobile device, through a browser extension, and/or using any other desirable mechanism.

Figure 5:
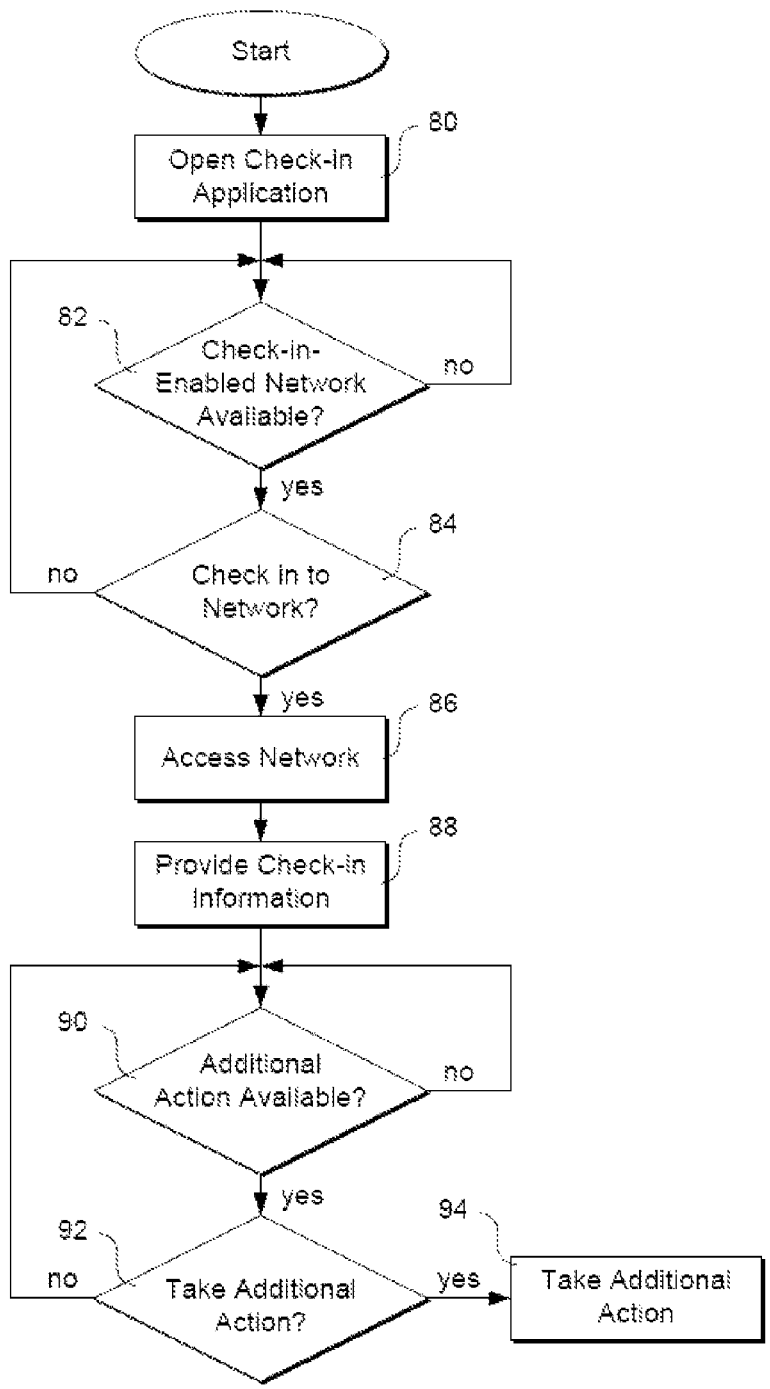
FIG. 5 shows a representative flow chart, illustrating steps of a check-in method in accordance with some embodiments of the invention.

FIG. 5 illustrates an exemplary process by which the check-in app on the mobile device 70 provides features to the mobile device's user. In accordance with some embodiments, execution begins at step 80, where the user accesses the mobile device 70 and opens or accesses the check-in app. Execution then proceeds to decision block 82, where the check-in app utilizes communication capabilities of the mobile device (e.g., telephony, wireless (802.11), Bluetooth, and/or any other suitable method) to determine whether any check-in enabled networks are available. If no check-in enabled networks are available, execution loops at this point until a check-in enabled network becomes available, or execution ends (e.g., the user ends the check-in app.

The business 76 providing the local area network provides a local-area network that is check-in enabled. When the local-area network is check-in enabled, it is distinguished in some fashion from standard local-area networks. The network may provide additional security features, may use additional or different communications protocols, and may identify itself to accessing devices (such as mobile device 70) and programs (such as the check-in app on the mobile device 70) differently from standard networks. This allows the user's check-in app to recognize check-in enabled networks for possible connection and check-in.

In some embodiments, once a check-in enabled is located, execution proceeds to decision block 84, where a determination is made as to whether to check in to the network. This might involve displaying available check-in-enabled networks to the user and allowing the user to select one of the available check-in-enabled networks (e.g., the one corresponding to the business 76 where the user wishes to check in). In some embodiments, when the user selects a network to check in, the system optionally uses information of the user stored by the user's mobile device 70 (e.g., in the check-in application) or provided by the user at the time of check-in to communicate with the network and check in.

Thus, in some embodiments, if the user elects to check in to the network, execution proceeds to step 86, where the mobile device 70 accesses the network, and step 88, where the mobile device 70 provides check-in information. The information may be provided using encryption or other secure technology, as is known in the art. In some embodiments, checking in notifies the business 76 that the user of the mobile device 70 is at the business 76 and allows the business 76 and the user to act accordingly, such as by placing the user in a queue to be seen, or to take any other action as will be discussed further below.

If, however, the user does not elect to check in to an available network (e.g., for example, the network to which the user wishes to check in is not available), then execution loops back to decision block 82. The mobile device 70 may then manually or automatically refresh available check-in enabled networks from time to time until a desired check-in-enabled network is available (e.g., in sufficient physical proximity and located by the user's mobile device 70).

The user's check-in information may be manually entered by the user at the time of check in, or the check-in information may have been previously entered in by the user (or another, including, without limitation, the user's legal guardian) and may be automatically transmitted by the user's mobile device 70 (e.g., by the check-in application) through the check-in-enabled network.

In some embodiments, the information conveyed by the mobile device 70 may include a unique check-in ID of the user (and/or a unique transaction ID (as discussed below) for one or more transactions carried out by the user) and, in some embodiments, the information conveyed by the mobile device is optionally limited to the unique check-in ID of the user (and/or transaction ID) so as to prevent others from intercepting personal data of the user over the wireless link (and/or any other suitable network connection). Thus, the user could previously have set up his or her information with a central repository of information maintained by (or otherwise associated with) the check-in provider. Such information could include, but is not limited to, identifying information such as name, address, telephone, email, and any other contact information, medical information (such as prescriptions, medical records, health provider contact information, medical history, and any other medical information), payment information such as credit card information, debit card information, bank account information, PayPal or other electronic payment account information, any other type of payment information, and/or any other type of information relevant to the user, the business 76, or any transactions to occur between the user and the business 76. Then, when the user checks in and the mobile device 70 transmits the user's check-in ID (and/or a particular transaction ID) to the business 76 through the check-in enabled network, the business 76 securely contacts the central repository and is able to retrieve the user's previously stored information using the user's unique check-in ID (and/or the transaction ID).

In a different example, the business 76 requests certain information from the central repository. Then, the central repository determines that access to the requested information requires authorization of the user. While this determination can occur in any suitable manner, in some embodiments, the determination occurs based on the nature of the information (e.g., medical information or records might always be subject to authorization requirements, while address information might not), and/or based on preferences previously identified by the user, such as on providing the information to the central repository. In some embodiments, once the central repository has identified a need for authorization, the central repository (or the entity providing the central repository) contacts the user to request the authorization. The central repository can contact the user using the local network (and/or any other suitable communication channel) and the check-in application on the user's mobile device 70. Alternatively, in some embodiments, the central repository uses a mechanism to request authorization that is independent of the local network (and/or other network provided for or by the business 76 to ensure that the business 76 cannot falsely represent that authorization has been received. For example, in some embodiments, the central repository requests the authorization through the check-in application, but using a connection between the mobile device 70 and the Internet (e.g., using a connection provided by the mobile provider 74). As another example, the central repository requests authorization by email, text message, and/or in any other suitable manner.

In some embodiments, the user is provided additional control over the release of information to the business 76. In a first example, the business 76 notifies the user at the time of check in the information that the business 76 wishes to obtain, and the user authorizes the business 76 to retrieve, the information either by providing the user's unique check-in ID (and/or a specific transaction ID) and/or by responding to an authorization dialog provided by the check-in application for transmission of an authorization to the business 76 with the user's check-in ID. In another example, the business 76 identifies information that it wishes to receive about the user after the user has checked in and requests an authorization from the user over the local network (and/or another suitable communication channel). In these two examples, the business 76 delivers the authorization with the request for information to the central repository.

In some instances, the user optionally selectively authorizes release of less than all the information requested by the business 76. For example, the business 76 might request home and cell telephone numbers, address, and birthdate. In this example, the user might believe that the needs of the business 76 justify releasing all the information requested except for birthdate, and could authorize release of all information except for birthdate. Limited releases of less than all requested information may occur automatically (e.g., the release is automatically controlled by rules previously established by the user), semi-automatically (e.g., the user authorizes release of information but only information allowed by previously established rules), and/or under the direct control of the user at the time of the request (e.g., the user authorizes each release of information).

In some embodiments, the check-in process is not limited to notifying the business 76 that the user has arrived, but additional actions may also be provided to the user and business 76. The provision of additional information about the user is only one example of an additional action that may occur upon or after check in. Therefore, returning to FIG. 5, execution proceeds to decision block 90, where a determination is made as to whether there are any additional actions that are available to the user of the mobile device 70 or to the business 76. If additional actions are found, execution proceeds to decision block 92, where a determination is made as to whether to take any available additional actions. If so, execution proceeds to step 94, where any steps necessary for taking the additional action are performed. Examples of additional actions may vary depending on the situation and needs of the user and/or business 76.

As another example in the medical field (and/or in any other suitable field), the business 76 may wish to provide the user with an opportunity to fill out any necessary check-in forms using the mobile device 70 (and/or otherwise), thereby reducing the workload on a receptionist. The user benefits by having to not wait in line to check in and fill out the check-in forms. Thus, when the user arrives at a medical office, the user is either aware that the business 76 provides the check-in feature or becomes aware such as through signage posted at the medical office (and/or in any other suitable manner). In some embodiments, the user then accesses his or her mobile device 70 and opens or otherwise accesses the check-in app. The app looks for available networks with the check-in feature enabled and displays the available networks. The user selects the network, and the check-in app notifies the business of the user's arrival. Additional information may be obtained as discussed previously.

Meanwhile, in some embodiments, the business 76 has software that is notified of the user's arrival and is able to look up the user in the appointment schedule and notifies the office assistant, attendant, and or other personnel of (and/or otherwise prepares for) the user's arrival. The business software may also have the option of pushing forward any forms that the patron must complete. In some embodiments, the user then completes the paperwork on his or her mobile device 70 and signs the documents electronically. In some such embodiments, the completed and signed documents are then returned to the business 76, and the business software is updated and the appointment is moved forward in the workflow process, all without any time-consuming interaction between the user and the office assistant/attendant and without any waiting in line by the user.

In some instances, further additional actions are optionally made available. For example, the user arriving at a medical appointment often is required to provide medical insurance information and/or make a copay at the time of service. The user's insurance information may be stored by the central repository as discussed above, and may be provided to the business 76 upon request and/or authorization of the user using the check-in app. In some embodiments, the check-in app also allows the user to make payments such as the copay. The payments may be made without releasing any confidential payment information of the user.

For example, the user may store payment data with the provider of the check-in app (and/or in any other suitable repository), including credit card payment data for one or more credit cards, medical benefits card payment data, checking and/or savings account payment data, and/or any other suitable data. In some embodiments, when the user is connected to the check-in enabled network, the business 76 requests payment for services provided or to be provided. In some such embodiments, the user then uses his or her check-in app to view the request for payment, to select a source of payment from available sources, and to authorize payment. When payment is authorized and made, the check-in app need not send the user's confidential payment data to the business 76. Instead, a one-time authorization is transmitted to the business 76, which uses the authorization to receive payment from the check-in app provider. Thus, the check-in app and the associated features provide an additional layer of security for the user's private information.

Other examples may occur in a retail setting (and/or any other suitable location). The user arrives at the business 76, such as at a grocery or department store. Again, when the user arrives at the store, the user is either aware that the business 76 provides the check-in feature or becomes aware such as through signage posted at the store. The user then accesses his or her mobile device 70 and opens or otherwise accesses the check-in app. The app looks for available networks with the check-in feature enabled and displays the available networks. The user selects the network, and the check-in app notifies the business of the user's arrival. Additional information may be obtained as discussed previously, including, in this example, customer loyalty information, coupons previously saved by the user, user preferences, special requests, and/or any other suitable information.

The business 76 may also immediately provide any available specials, such as weekly or daily specials, to the user through the check-in app. Additionally, the user may be provided with an opportunity to search for items sold by the store, such as to look up "children's bikes" or any other suitable searches relevant to the offerings of the business 76. In some embodiments, the store may use multiple networking units provided throughout the store (and/or other location) to assess the relative signal strengths between the units and the user's mobile device 70 to triangulate the user's location within the store and to provide directions to the user through the mobile device 70 and check-in app to guide the user to a desired location.

In some embodiments, when the user completes his or her shopping experience and is checking out, the retailer rings up all the items and creates a total. In some such embodiments, the purchaser reviews the total and selects to pay the total through the check-in application. Additionally and alternatively, in some embodiments, the user utilizes the check-in application to apply any coupon savings stored by the user and/or available through the check-in system. When payment is to occur, the total can be transmitted to the mobile device 70 and check-in application directly, by a scan operation conducted by the mobile device, by entering in a code provided by the retailer at the point of check out, by triangulation of the user's location, by geolocation techniques, and/or by any other relevant means. When the user reviews and pays the total, payment may be processed as discussed above, with the user selecting a payment source and making payment without the retailer ever knowing or obtaining the user's payment information. In some embodiments, the retailer updates the user's loyalty account information, and the update is linked to the check-in account information.

Check-in features and benefits as discussed herein may be provided to businesses 76 such as medical offices, retailers, food providers, hotels, motels, service providers, spas, repair shops, laundromats, and the like at little to no cost, but additional revenues may also be achieved. When each business 76 signs up for the check-in system, it provides its exact physical address to the check-in provider. In some embodiments, the check-in provider then is able to use the address information to provide additional features to the user. For example, the user of the mobile device 70 may access the check-in application to conduct a search for businesses 76 providing the check-in features. The user may be provided with a map of the city or other location in which the user is currently located or travelling, or a map of any desired location (e.g., for future planning). Locations of businesses 76 providing check-in features as discussed herein may be marked on the map with relevant information, such as the type of business, etc. In some instances, the user is provided with an opportunity to make a reservation or appointment, and the user is then able to check in upon arrival as discussed above.

Additionally, in some embodiments, the business 76 is optionally provided with an opportunity to purchase search terms and/or advertising for the check-in system. Then, in some embodiments, when a user operates the check-in app and the business 76 has purchased advertising, the user is shown advertising (e.g., advertising purchased by the business 76 and/or otherwise provided). Alternatively, when the user conducts a keyword search using the check-in app and the business 76 has purchased relevant keywords, the business 76 may be featured in the search results.

As a further extension of these concepts, in some embodiments, the user uses the check-in app to place an order prior to arrival. Thus, the user may use the map, advertising, or some other search feature to locate a desired business 76, such as a fast food restaurant. In some embodiments, upon selection of the business 76, the check-in app obtains a menu or other ordering information for the business and provides the information to the user, who uses the check-in app to place an order. In some embodiments, the user even uses the check-in app to pay for the order, in a fashion similar to that discussed above, with no personal information of the user sent to the business 76. All this may occur before the user is connected to the business's local network. Instead, the check-in app and mobile device 70 communicate by other means, such as using the cell site 72 and Internet connectivity provided by the mobile provider 74 or using another connection (e.g., Bluetooth, WiFi, etc.) to the Internet available to the mobile device 70.

Various options may be used to timely provide the user with his or her order (and/or other goods, services, accommodations, etc.) upon arriving at the business 76. As one example, when the user arrives at the business, he or she checks in to the business using the check-in app in a manner similar to that discussed above. At the time of check in, the business 76 may utilize the check-in app to direct the user to a proper parking space (e.g., for pickup of the user's order), or the user could pass through a drive-up window as normal, and know that the order will be prepared shortly after check-in. As another alternative, at the time of placing the order, the check-in app is used to query the user whether the system is authorized to use tracking features of the user's mobile device (e.g., GPS, cell tower triangulation, and the like) to track the user's location and provide the location to the business 76. Upon authorization of the user, the user's location information can be provided to the business 76 so the business 76 can know where the user is and when to prepare the user's order so that it will be ready immediately upon the user's arrival. Similarly, a sit-down restaurant could use location information to determine that the user will not arrive by his or her scheduled appointment time and could rearrange the queue to serve other patrons while still keeping an appointment for the user available for the user's arrival.

There are other examples of additional actions that may be taken after checking in to the business. For example, once the user has checked in at the business 76, in some embodiments, the check-in app becomes interactive in one or more of a variety of fashions. At a restaurant (and/or another business), for example, the app may allow the user to identify how many people are in the user's party and whether or not all members of the party are present or not. If not all members of the party are present, the app might allow the user to update an arrival status as members of the party arrive so that the restaurant knows when to seat the party. Meanwhile, the user may be put in the restaurant's queue. The restaurant could notify the user of his or her wait time (and changes to the wait time as time passes), and could even use notification features of the mobile device (ringtone, vibration, spoken announcement, etc.) to notify the user when the restaurant is ready to seat the user's party. Thus, restaurants would no longer need to provide guests with separate notification devices as sometimes currently occurs.

In some instances, notifications to the user may occur whether or not the user is within range of the business's local check-in-enabled network. Such notifications may occur with or without disclosure of information about the user to the business 76. In one example, the business 76 could notify the provider of the check-in service/app of the relevant information (updated wait time, ready to seat party, etc.) and the provider of the check-in service or app could then either contact the user by text message, automated telephone call, through the check-in app, and/or in any other suitable manner capable of passing the relevant information. In another example, the business 76 optionally has the check-in app request additional information from the user (e.g., the user's phone number associated with the mobile device) and then uses that information to contact the user (e.g., by text message, automated telephone call, live telephone call by personnel of the business 76, and/or in any other suitable manner).

While certain forms of security have been discussed previously herein, additional levels or kinds of security may also be provided. For example, in some instances, information of the user that is provided to the business 76 may be provided in such a way as to limit an amount of time that the information may be electronically stored by the business 76. Thus, the user's information may expire after passage of a certain amount of time when the business 76 presumably no longer needs access to the information.

As another example of enhanced security, the unique user check-in ID (and/or unique transaction ID (as discussed below)) provided by the check-in app may be protected with additional protections to prevent others from attempting to use the user's check-in ID (and/or transaction ID). In some embodiments, each user has a single unique check-in ID for all purposes. In some embodiments, in an enhanced-security embodiment, the check-in app generates a new unique check-in ID (and/or transaction ID) at each check in, so that if the check-in ID (and/or transaction ID) were intercepted by another party or if the business 76 (or a dishonest employee of the business 76) were to attempt to use the check-in ID (and/or transaction ID) elsewhere, it would not function properly.

In some embodiments, to further protect a user and/or businesses, the described systems create a unique transaction ID (as mentioned above) that is associated with one (or in some cases, more than one) transaction between a user and a particular business. In some such embodiments, the transaction ID is attached to (and/or otherwise associated with) the user's check-in ID as well as a check-in ID of the business. Additionally, in some such embodiments, most (if not all) actions (e.g., provision of insurance information, payments, completed forms, check-in procedures, and/or other additional actions reference the corresponding transaction ID.

In some embodiments, the described systems use the transaction ID to ensure that additional actions (as discussed below) can only be accomplished when a transaction with a corresponding transaction ID is open or pending. In some further embodiments, when a transaction closes (e.g., is closed by a client, times out, expires, is completed, the use checks out of or otherwise leaves a business, and/or the transaction otherwise terminates), no additional actions can be performed under that ID, unless the user previously authorized such actions.

In one example, when a patient uses an embodiment of the described system to check in to a doctor's office, a transaction begins and a transaction ID is assigned to that particular transaction. In this example, as the patient completes necessary forms, authorizes the payment of a single copay, authorizes the office to bill a third-party insurance, allows the office to share pertinent patient information with the insurance company, allows the office to upload medical information (e.g., lab reports, a diagnosis, etc.) to the patient's personal health databases, allows the office to further access the patient's personal health information for a period not to exceed sixty days from the patient's visit to the office etc., the transaction ID is associated with each such action. In this example, even if the transaction were still open, the described system would deny payment to any other business that was not authorized by the patient and would further deny other payments to the doctor's office under the transaction ID, unless additional authorization were given. Moreover, in this example, the described systems would further prevent the doctor's office from viewing the patient's personal health information after the authorized sixty day period.

While the described transaction ID (as well as user and/or business check-in IDs) can be setup at any suitable time and in any suitable manner, in some embodiments, the transaction ID is created as part of the check-in process for a particular visit to a business, before the actual check-in process occurs (e.g., when an appointment is made), and/or at any other suitable time. Indeed, in some embodiments, the transaction ID is created when an appointment is made and the transaction is kept in a pending state, an inactive state, and/or another suitable state ("pending") until further acted upon by the user (e.g., when the check-in process actually occurs). In such embodiments, when the user checks in to a business, the described systems would check the pending transaction (e.g., for specific authorizations, information, etc. provided by the user) during check in to provide the user with one or more check-in options (e.g., discounts, coupons, perks, services, goods, etc.).

Where the described systems and methods allow for pending transaction (e.g., with a corresponding transaction ID) to be created, such transactions can terminate in any suitable manner. Indeed, in some embodiments, such transactions terminate by self-expiring after a certain date, closing after a certain period of time has passed, closing after a certain time period of user inactivity, etc. In this manner, the transaction ID can further prevent unauthorized actions from taking place.

Further security may be provided by tracking each use of the check-in system, a user's check-in ID, and/or specific transaction IDs. For example, each use may be tracked and stored at the central repository. Additionally, each use of a check-in ID associated with the user (and/or a transaction ID) might generate an email, text message, and/or other log message to the user, either at the time of use or in summary fashion from time to time, as in a statement or periodic communication. In some embodiments, the system flags suspicious activity. For example, because the check-in system is largely intended for use by persons in physical proximity to a business of interest, attempts to check-in as the same user in different locations (e.g., in geographically spaced cities and/or other locations) in close temporal proximity might be flagged as potentially fraudulent. In some embodiments, and in such a situation, any further attempts to check in are disabled until a verification procedure ensures that the user has control over his mobile device 70 and his or her check-in information.

Additional security may be provided at the mobile device 70 by the check-in app, in fashions known in the art. For example, because the check-in app may be used to make payment, in some embodiments, the check-in app will require a password and/or other authentication step to access the check-in app and/or the payment function of the check-in app. In some embodiments, an authentication step includes a biometric authentication, such as a face-match authentication, a fingerprint authentication, and/or the like, a password or other entry authentication, a challenge/answer authentication and/or any type of authentication known in the art. In some embodiments, mobile device security ensures that the mobile device 70 cannot be stolen and the check-in app fraudulently used.

The described systems and methods can be modified in any suitable manner. Indeed, in some implementations, instead of requiring a user's mobile device to check into a business' check-in enabled network before the user is checked into the business, the user's mobile device (e.g., smartphone, tablet, handheld computer, cellphone, function phone, and/or any other suitable known or novel mobile device) is configured (e.g., via an app installed on the device and/or a webpage accessible through the device) to use the device's own communication methods (e.g., its telephone services, WiFi, Bluetooth, etc.) to check into the business. Such a check in process can be initiated in any suitable manner, including, without limitation, by having the user start the check-in process through an app and/or website, by having the device prompt the user to check-in to the business (e.g., via the app and/or a webpage) when the device comes in proximity to the business, and/or by having the device automatically begin the check-in process as the device is determined to be in proximity to the desired business. In this regard, the proximity of the mobile device to the business can be determined in any suitable manner, including, but not limited to, the use of GPS location coordinates; the use of multi-lateration of radio signals between radio towers and/or transmitters (e.g., cell tower triangulation) for applicable mobile devices; a Bluetooth positioning technique, a WiFi positioning technique, and/or any suitable technique that is capable of substantially determining the proximity of a user's mobile device to a specific business location.

While numerous examples of uses of the check-in services and methods have been provided and discussed herein, the examples should be understood as being illustrative rather than restrictive. Indeed, the check-in service may be provided at any location or business where the service may be desirable. For example, the check-in service could be provided at businesses providing a variety of services, such as car repair/service businesses, salons (hair, nail, etc.), take-out and sit-down restaurants, golf courses, bowling alleys, other appointment-based sports businesses, medical offices, law offices, dentists, any other business providing treatments and/or services, government offices, any other offices having a waiting line or list, parking services, and the like. The systems and methods may be varied as necessary to provide desirable features.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method of providing check-in information from a mobile computer device to a check-in enabled network, the method comprising:
    providing check-in information to the check-in enabled network, the check-in information being sent wirelessly from the mobile computer device to the check-in enabled network, the mobile computer device comprising a processor and a memory that stores the check-in information, wherein the processor:
        recognizes when the mobile computer device is within a sufficient physical proximity to an entity that provides goods or services in return for a payment, the entity being in communication with the check-in enabled network;
        based on location of the mobile computer device, causes the mobile computer device to access the check-in enabled communications network that is in communication with the entity; and
        sends the check-in information to the check-in enabled network when the mobile computer device is within the sufficient physical proximity to the check-in enabled network so as to alert the entity in communication with the check-in enabled network of an arrival of a user of the mobile computer device and to begin checking the user into the entity,
    wherein the check-in information comprises a unique identifier that is sent to a third-party information repository and that is used to retrieve pre-stored medical information relating to the user from the third-party information repository,
    wherein the pre-stored medical information comprises at least one of insurance information, medical information, and payment information,
    wherein the third-party information repository queries the user to selectively identify at least a portion of the pre-stored medical information in response to the third-party information repository receiving the unique identifier, and
    wherein the third-party information repository transfers the portion of the pre-stored medical information to the entity in response to the portion of the pre-stored medical information being identified by the user.

2. The method according to claim 1, wherein the pre-stored information comprises the payment information.

3. The method according to claim 1, wherein the method further comprises: using a tracking feature of the mobile computer device to track a location of the mobile computer device, and using the location of the mobile computer device to at least one of: (i) determine when to prepare to an order for the user and (ii) rearrange a queue to which the user is a party.

4. The method according to claim 2, wherein the method further comprises using the unique identifier to contact the third-party information repository, to retrieve the payment information, and to provide a payment to the entity.

5. The method according to claim 4, wherein the unique identifier is free from specific billing information needed for a transaction so as to protect the specific billing information from being intercepted over a network connection.

6. The method according to claim 1, wherein the portion of the pre-stored medical information comprises the insurance information.

7. The method according to claim 1, wherein the check-in information is limited to the unique identifier to prevent interception of personal data over a network.

8. The method according to claim 3, wherein the method further comprises using the mobile computer device to provide a wait time to the user.

9. The method according to claim 1, wherein the portion of the pre-stored medical information includes the insurance information and the payment information.

10. The method according to claim 1, wherein the method further comprises denying a payment to a business that is not associated with the unique identifier.

11. The method according to claim 1, wherein a transaction involving the unique identifier is marked as being closed, and wherein the method further comprises allowing actions associated with the transaction that were previously approved by the user to be performed after the transaction is marked as closed.

12. A method for providing check-in information from a mobile computer device to a check-in enabled network, the method comprising:
    providing a check-in application to a user for installation on the mobile computer device, receiving at the check-in enabled network, check-in information from the mobile computer device, the check-in enabled network comprising a device having a processor that:
        detects when the mobile computer device attempts to access the check-in enabled network;
        establishes a wireless connection with the mobile computer device via the check-in enabled network; and
        receives the check-in information via the check-in enabled network to identify a user of the mobile computer device as having arrived at an entity associated with the check-in enabled network and to interface with the entity to check the user in with the entity,
    wherein the check-in information is sent to the check-in enabled network once the mobile computer device is within a sufficient physical proximity to the check-in enabled network,
    wherein the check-in information comprises a unique identifier associated with at least one of the user and a current transaction,
    wherein the unique identifier is electronically sent to an information repository to retrieve pre-stored medical information of the user,
    wherein the pre-stored medical information comprises at least one of insurance information and payment information,
    wherein the information repository queries the user to selectively identify at least a portion of the pre-stored medical information in response to the information repository receiving the unique identifier,
    wherein the information repository sends the portion of the pre-stored medical information to the entity in response to the portion of the pre-stored medical information being identified by the user,
    wherein, once the user has checked into the entity, the user is placed in a queue, and
    wherein the entity rearranges the queue based on location information of the mobile computer device.

13. The method according to claim 12, wherein the method further comprises:

determining whether any additional actions are available to provide to the mobile computer device via the check-in enabled network;

when an additional action is available, presenting the additional action to the user via the mobile computer device; and receiving input from the mobile computer device to take the additional action, wherein the additional action comprises an action selected from the group consisting of:
- completing a check-out transaction associated with a purchase of goods within a location;
- directing the user to a parking location for an order pick-up; and
- providing the user with a wait time.

14. The method according to claim 12, wherein a transfer of funds occurs directly between the information repository and the entity.

15. The method according to claim 14, wherein the information repository obtains authorization for the transfer of funds from the user via the check-in enabled network and the mobile computer device.

16. The method according to claim 14, wherein the information repository obtains authorization for the transfer of funds from the user via a third-party network and the mobile computer device.

17. The method according to claim 13, wherein the additional action comprises notifying the user of a wait time.

18. A method for providing check in information from a mobile computer device to a check-in enabled network, the method comprising:

determining when a mobile computer device is within a set distance from a medical facility having a check-in procedure;

prompting a user to check into the medical facility with the mobile computer device when the mobile computer device is within the set distance from the medical facility; and initiating a transmission of check-in information, wherein the check-in information comprises a unique identifier associated with at least one of the user and a transaction, wherein the unique identifier is electronically transmitted to a repository, wherein the repository queries the user to selectively identify at least a portion of pre-stored medical information in response to the repository receiving the unique identifier, the pre-stored medical information comprising at least one of insurance information, medical information, and payment information, and wherein the repository transfers to the medical facility the portion of the pre-stored medical information in response to the portion of the pre-stored medical information being identified by the user.

19. The method as recited in claim 18, further comprising providing the user a wait time prior to receiving a service from the medical facility.

20. The method as recited in claim 18, further comprising using the mobile computer device to notify the medical facility of the user's arrival to the medical facility.

21. The method as recited in claim 18, wherein, once the user has checked into the medical facility, placing the user in a queue, and wherein the medical facility rearranges the queue based on location information of the mobile computer device.

* * * * *